United States Patent

[11] 3,587,696

[72] Inventor H. Bradley Fairchild
P. O. Box 448, Woodside, Calif. 94062
[21] Appl. No. 584,452
[22] Filed Oct. 5, 1966
[45] Patented June 28, 1971

[54] COCONUT TREATING APPARATUS AND PROCESS
22 Claims, 11 Drawing Figs.
[52] U.S. Cl. .................................................. 146/222,
146/7, 146/225, 146/227, 260/412.2
[51] Int. Cl. ...................................................... C11b 1/00,
A23n 15/00
[50] Field of Search .......................................... 260/412.2;
146/7, 222

[56] References Cited
UNITED STATES PATENTS
2,101,371  12/1937  Lava ............................ 260/412.2(X)
2,331,785  10/1943  Lachle ......................... 260/412.2
3,106,571  10/1963  Birosel ........................ 260/412.2
3,451,990  6/1969   Sole ............................ 260/412.2(X)

Primary Examiner—Willie G. Abercrombie
Attorney—Flehr, Hohbach, Test, Albritton & Herbert ABSTRACT: A process for separating the natural oil from fresh coconut meat comprising finely comminuting the meat into a flowable slurry, raising the temperature of the slurry, pinch pressing the heated slurry to separate liquid constituents therefrom, including oil, and centrifuging said slurry to separate the natural oil from the solid fibrous constituents and other aqueous phase constituents. An apparatus for performing the process is also disclosed.

INVENTOR.
H. Bradley Fairchild

BY Borghew, Mohler, Foster & Schlemmer
Attorneys

Fig. 3

INVENTOR.
H. Bradley Fairchild

INVENTOR.
H. Bradley Fairchild
BY
Boysen, Mohler, Foster & Schlemmer
Attorneys

COCONUT TREATING APPARATUS AND PROCESS

This invention relates generally to the treatment of coconuts. More particularly, this invention relates to the treatment of fresh wet coconut meat promptly after such meat has been separated from the coconut shells and under circumstances which preclude color or flavor changes or other alterations of the natural characteristics of the meat and its respective fluid and solid constituents.

Still more particularly, this invention relates to an apparatus and process for effecting maximum removal of coconut oil and other utilizable constituents from previously untreated coconut meat in a procedure which obviates the production of free fatty acids and denatured emulsions which have characteristically resulted from the treatment of coconut meat with prior mechanized treating procedures. The separated coconut constituents obtained with the subject apparatus and process are characterized by the full natural flavor and aroma of fresh coconuts and their freedom from unnatural characteristics heretofore encountered.

The apparatus and process of this invention have particular utility when employed directly at the coconut source, that is, in or closely adjacent to the actual field where the coconuts to be treated have been grown. To this end, the apparatus as herein disclosed has been developed to be of small, readily transportable size which can be moved in toto on a suitable vehicle directly to the coconut source. Thereby, the high costs previously encountered in transporting whole coconuts from their source to a central treating plant have been essentially eliminated.

In its broader aspects, this invention relates to a two stage coconut treating procedure each stage of which may include several steps. In the first stage, sections of fresh coconut meat are treated to transform the same into a flowable finely comminuted slurry which is natural in character and which is fatty acid free. In the second stage, the slurry obtained in the first stage is treated, preferably in the presence of heat, to separate a high quality commercial grade coconut oil from the cellulosic fibers and other solid and liquid constituents of the original coconut meat.

The liquid constituents thereafter preferably are separated as an aqueous phase from the cellulosic fibers and other solids of the slurry. The aqueous phase byproduct solution thus separated is reintroducible into the treating system for the purpose to be described, or may be utilized for the manufacture of known coconut base beverages, such as beer, or for the feeding of livestock. The cellulosic fibers and other solid constituents separated as a byproduct may be utilized as a high protein food concentrate suitable for human consumption as a food supplement, or as a livestock feed.

It has been found in the treatment of fresh coconut meat that great care must be taken to preclude the possible production of denatured emulsions which separate with difficulty. The apparatus and process of this invention have been designed to obviate that possibility and to ensure that the highly important end products sought as above noted, free of denatured characteristics, are obtainable directly from fresh coconut meat at or near the source thereof in a relatively simple mechanized operation.

By way of a more detailed yet brief summary, the procedures employed in this invention embody the fine comminuting of sections of fresh wet coconut meat in a specially designed machine which transforms the meat into a flowable slurry, preferably in the presence of a quantity of moderately heated aqueous phase solution obtained from previously treated sections of coconut meat. Thereafter, the slurry preferably is heated to further increase its flowability and to facilitate separation of the oil from the other constituents thereof, following which the slurry is treated to separate the oil and to produce the other desirable by-products above mentioned.

In this regard, such oil separation, depending upon the quality desired therefor and the particular byproducts sought, may take place in several different operations. In one such operation, the heated slurry is directly treated in a centrifuge to separate the oil therefrom, following which the precipitate of fibrous and other solid constituents and other essentially oil-free liquid constituents are further treated in another separator unit to remove the aqueous phase byproduct solution therefrom. The remaining solid byproducts may thereafter be subsequently treated, in a conventional solvent extraction unit, for example, to further remove any entrapped oil therefrom.

In an alternate and preferred operation, however, the heated slurry is first treated in at least one specially designed filter press machine in which a natural emulsion of the slurry, containing essentially all liquid constituents of the slurry, is separated from the fibrous and other solid constituents thereof. The emulsion is thereafter centrifuged to provide a very high grade commercial coconut oil. The precipitate which exits from the centrifuge is preferably transferred to another separator unit in which the aqueous phase solution is separated from any retained solids which may have passed from the filter press into the centrifuge. This aqueous phase solution, preferably following some heating thereof, may be utilized to any extent desired in the production of more slurry. Any excess aqueous phase solution may be employed as noted previously as a base for beverages or for livestock feeding.

By finely comminuting the coconut meat in the machine specifically designed therefor as will be described, the cell structure of the meat is substantially completely broken down, which thereby facilitates natural emulsion extraction from the remaining constituents of the meat in the specially designed filter press and attendant ease of separation of the oil in the centrifuge. The filter press differs from mechanical devices heretofore known for coconut treatment which normally employ rotatable screws or like pressure devices which apply substantial pressure to the meat being treated and which, as a result, substantially raise the temperature of the meat to a level which is conducive to the formation of undesirable denatured or artificial emulsions and other unnatural characteristics in the resulting product. With the special filter press of this invention, a pinching or squeezing pressure is applied to the slurry in a comparatively delicate manner which does not appreciably raise the temperature thereof yet which effectively separates the natural emulsion from the cellulosic fibers and other solids of the coconut meat.

From the foregoing it should be understood that objects of this invention include: the provision of an improved apparatus and process for treating coconuts; the provision of an apparatus and process for obtaining a high quality commercial grade coconut oil and other usable liquid and solid byproducts directly from fresh, wet, previously untreated coconut meat; the provision of a readily transportable, self-sustaining apparatus which may be employed in the treatment of coconuts directly at the source of coconuts; the provision in such an apparatus of an improved machine for transforming coconut meat directly into a flowable slurry; the provision in such an apparatus of an improved filter press for extracting and separating a natural coconut emulsion from a flowable slurry; the provision in such an apparatus of means for further separating the oil from the remaining aqueous phase solution of the emulsion; and the provision in an improved coconut treating process of a procedure for treating a natural coconut emulsion to obtain the natural oil and other usable byproducts therefrom.

The foregoing objects, among others, will become evident from a study of the following disclosure in which reference is directed to the appended drawings.

The major portion of coconut oil produced today is obtained from air or kiln dried copra and the resulting coconut products possess certain well-known undesirable characteristics inherent with products obtained from copra. This invention, however, is intended to obviate the undesirable characteristics of copra products and, to this end, fresh coconuts are treated to obtain first a natural flowable slurry from which coconut oil and other byproducts free of denatured characteristics may subsequently be separated.

While the apparatus of this invention may take various sizes, as noted previously, it has been specifically designed to meet the needs of the small coconut growers in various coconut producing countries of the world, of which the Philippines is typical. By way of example, the apparatus illustrated has been designed for utilization by a grower or cooperative village having available coconut trees in a stand of 2,000 to 3,000 hectares which is normally capable of producing approximately 25 tons of fresh coconut meat per day. This quantity can be treated in about an 8-hour shift utilizing the subject apparatus. By utilizing the apparatus of this invention, therefore, a small grower or cooperative village can schedule processing of its entire coconut output on a day-by-day basis without resorting to copra production as heretofore, and without encountering costly transportation charges.

In this latter regard, it is known to be simpler, and accordingly more profitable, to extract coconut oil and other usable byproducts directly from fresh coconuts rather than indirectly from copra. However, a principal obstacle encountered heretofore to direct extraction procedures has been the high cost of transporting whole coconuts to centralized processing facilities, thereby making copra processing commercially attractive even with its numerous inherent disadvantages and wasteful nature. By providing a self-contained, self-supporting apparatus which may be utilized directly in the field at the coconut source, the prohibitive transportation costs heretofore encountered may be obviated.

An important feature of this invention is the fact that a coconut emulsion which is free of denatured constituents and artificial emulsions will readily yield its oil in a centrifuging operation. This invention utilizes that fact by insuring that the emulsion treated is free of any artificial emulsions which are difficult to break down in a centrifuge and which therefore make difficult or impossible the separation of oil and byproducts in a centrifuging operation. By finely comminuting fresh coconut meat sections into a flowable slurry in the manner described herein, without attendant denaturing, artificial emulsions are eliminated.

A preparatory step in practicing this invention is the separation of quantities of fresh coconut meat in sections from their shells in any suitable manner. In this regard, known manual or mechanical operations may be employed, depending upon the labor force available. The thus separated meat sections are then ready for further treatment.

Figure 3:
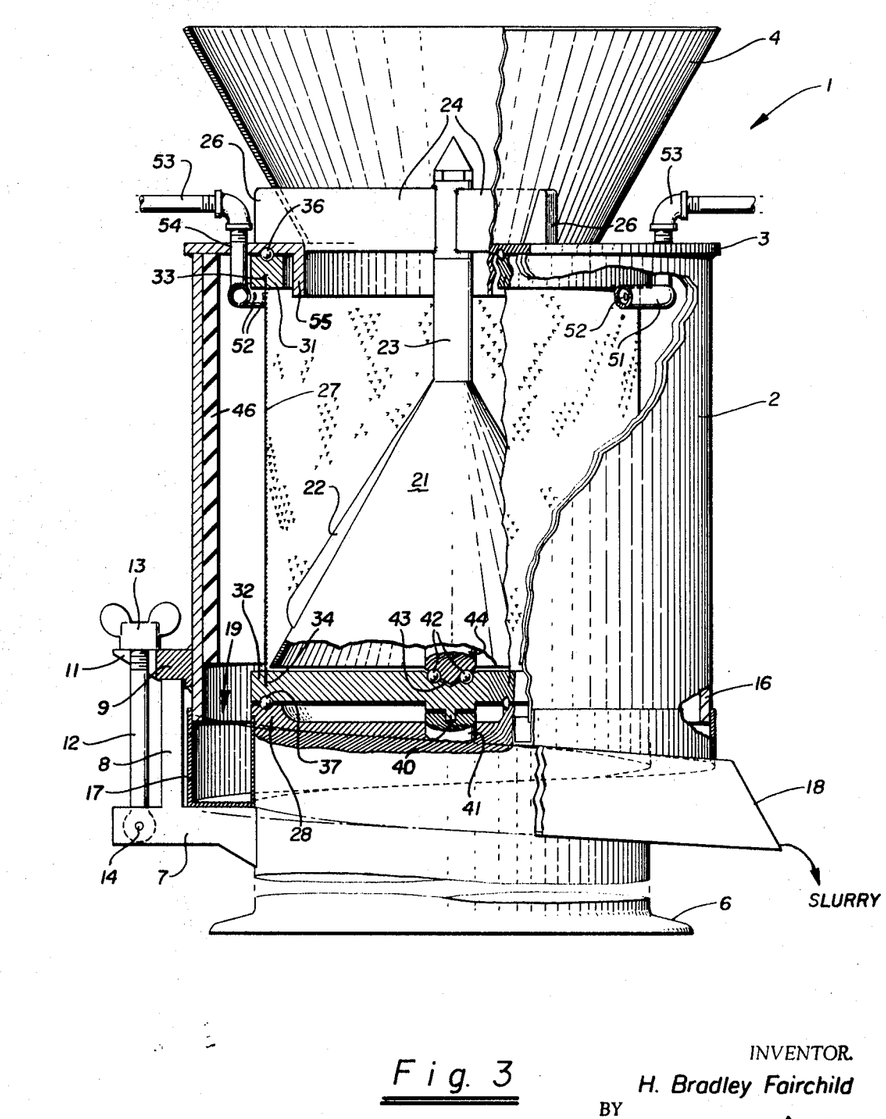
FIG. 3 is a front elevational view, partly in cut away section to show internal details, of an improved machine for producing a flowable slurry directly from fresh coconut meat.

The first treating step is the fine comminuting of the coconut meat sections to transform the same into a flowable slurry. The improved means for producing this slurry, generally designated 1, comprises a slurry making machine which, as seen in FIG. 3, comprises one upright housing 2 defined by a right circular cylindrical metal shell the top of which is surmounted by a cover plate 3 welded or otherwise suitably secured to the upper end of the shell. Projecting upwardly from the cover plate 3 is an inverted frustoconical hopper 4 into which the coconut meat sections may be directly introduced following separation thereof from the coconut shells.

The housing is supported by a rigid base 6 having three or more equispaced lugs 7 projecting radially outwardly from an upper portion thereof, only one of which is seen in FIG. 3. A cylindrical rim 8 extends vertically from the lugs 7 concentrically with housing 2 and provides at its upper end a flat mounting surface for three or more radially projecting ears 9. Each of the ears is welded or otherwise suitably secured to the outer periphery of the housing shell so that the housing may rest upon and be supported by rim 8. EAch of ears 9 is bifurcated at its outer end, as seen in 11, to accommodate therein a pivotal mounting bolt 12 having a thumb nut 13 threaded on its upper end. Each such bolt is pivotally secured at its lower end to a lug 7 by means of a pin 14 extending therethrough. To permit disengagement of the housing from the base 6, it is merely necessary to release the thumb nuts 13 and pivot bolts 12 downwardly.

The lower end 16 of the housing shell has engaged therewith trough structure for collecting the slurry produced in the slurry machine. This trough structure comprises an open top spiral flume 17 defined by opposing sidewalls and a bottom which progressively increases in depth from a reference position on the housing about its full periphery to its discharge end 18. The flume is progressively inclined downwardly so that slurry produced in the slurry maker may flow under the effects of gravity in a generally circular path to emanate from the flume at the discharge end 18 thereof. The flume may be bolted or otherwise removably secured to the housing, or alternatively may merely fit snugly over the housing end as shown.

It should be noted that the outer wall of the flume is generally in vertical contacting alignment with the housing of the slurry machine and that the housing and flume together define a circumferential leakproof passageway 19 at the lower end 16 of the housing through which the slurry may pass into the flume following comminution of the coconut meat.

Mounted axially internally of the housing is structure for guiding the coconut meat sections to be comminuted. The guide structure takes the preferred form of a hollow guide cone 21 which preferably has a series of equally spaced guide ribs 22 formed along the outer surface thereof. The cone 21 is mounted in depending relationship within the housing by means of a mounting shaft 23 which extends axially thereof and therethrough and which in turn is secured at its upper end to a series of spider arms 24 which extend radially from the axis of the housing to and through suitable apertures provided in the hopper 4. The outer extremities 26 of the spider arms rest upon the cover plate 3 of the housing and preferably are secured thereto by welding or other suitable means.

Mounted concentrically within the housing and spaced from the internal wall thereof is structure for comminuting the coconut meat which comprises a perforated shredding cylinder 27 which extends the full vertical distance between cover plate 3 and the upper portion 28 of the base 6 of the machine. The construction of the shredding cylinder may vary, as hereinafter described, but such cylinder irrespective of its particular constructional details, is securely mounted between an upper mounting ring 31 and a lower mounting plate 32. Each of said ring 31 and said plate 32 have circular grooves 33 and 34 respectively provided therein into which the upper and lower ends of the shredding cylinder are snugly received. The ring 31, cylinder 27 and plate 32 are maintained in proper orientation by the bolts 12 which apply axial pressure to the housing when engaged with ears 9.

The cylinder mounting ring 31 is movably separated from the under surface of cover plate 3 of the housing by means of suitable ball bearings 36 or equivalent devices. Corresponding ball bearings or equivalent devices 37 are interposed between the cylinder mounting plate 32 and the upper surface of the upper portion 28 of the machine base.

Preferably mounted in the base of the slurry machine is an electric motor, not shown, which is operatively connected with a vertically extending drive shaft 41 which is keyed at 40 to the cylinder mounting plate 32. Thus, upon actuation of the electric motor, the mounting plate 32, the shredding cylinder 27, and the mounting ring 31 will be rotated in unison within the housing and coaxially thereof. To permit such relative rotation between the stationary guide cone 21 and the shredding cylinder, suitable ball bearings 42 or equivalent devices are interposed between the lower end of the cone mounting shaft 23 and a recess 43 provided centrally of the cylinder mounting plate 32. Recess 43 is generally conical in configuration and the lower end 44 of shaft 23 is similarly contoured to be received therein with the ball bearings 42 interposed therebetween. By utilizing a standard selectively variable speed electric motor, the shredding cylinder may be rotated at various speeds within wide limits to produce slurries having varying characteristics. It should be understood that such a slurry of comminuted solid particles of coconut meat and liquid constituents released therefrom during shredding pass downwardly through the circular passage 19 into the flume 17 for gravity discharge from end 18 thereof.

It has been found that, because of the high speeds of rotation of shredding cylinder preferably employed to ensure thorough comminution of the coconut meat without appreciable production of frictional heat that the comminuted particles and liquids pass through the cylinder at high speeds and, unless cushioned, will strike the inner wall of housing 2 with an impact sufficient to transform the characteristics of the slurry into an unnatural emulsion. To preclude the formation of such a denatured emulsion, the impact of the particles and liquid freed therefrom is cushioned by structure interposed between the shredding cylinder and the housing wall. Such structure comprises a cylindrical cushioning blanket, designated 46, which may take the form of a soft rubber sheet or tube suitably adhered in any desirable fashion to the inner surface of the housing wall. To preclude absorption of slurry into the blanket, the exposed surface thereof is generally smooth and impervious.

To further prevent the formation of denatured emulsions in the comminuted slurry, other structure is provided for directing a liquid solution into the space between the shredding cylinder 27 and the cushioning blanket 46. Such solution also enhances the slurry characteristics and flowability of the comminuted particles and the fluids released therefrom. Such other structure in the preferred embodiment shown comprises a conduit 51 surrounding the shredding cylinder adjacent the upper end thereof which is positioned in the space between the cushioning blanket 46 and the cylinder. Such conduit extends the full distance around the cylinder and includes a series of equally spaced fluid dispensing openings 52 therein through which the aqueous solution may emanate in a generally inwardly and downwardly extending direction towards the outer surface of the shredding cylinder. Conduit 51 in turn is connected to a source of supply for the aqueous solution via two or more inlet pipes 53 which pass through suitable openings 54 provided in housing cover plate 3.

Preferably cover plate 3 is provided with a depending internal rim 55 which extends into the area defined by the shredding cylinder and prevents contact of any coconut sections with the rapidly rotating upper mounting ring 31 of the cylinder, which contact could form undesirable artificial emulsions. It should also be noted that at its lower end the cylinder and the base of the stationary cone 21 are in close proximity to preclude passage of uncomminuted sections of coconut meat downwardly beneath the stationary cone. The shape of the cone and the position of its base relative to the shredding cylinder ensure that all coconut sections introduced into the housing will be urged outwardly into contact with the rotating cylinder to pass therethrough. By making the cylinder, rather than the cone, rotatable it has been found that uneven loading, to which the slurry making machine will inevitably be subjected, will be readily compensated for and easily overcome.

The air draft which is produced due to the rapid rotation of the cylinder is effectively employed in conjunction with the introduction of aqueous solution against the cylinder to ensure downward flow of the comminuted coconut meat particles, the liquids separated therefrom, and the aqueous solution added thereto, downwardly into the spiral flume toward the discharge end 18 thereof. In this regard, it has been found preferable to rotate the cylinder at a tangential speed of 1,000 to 1,500 linear feet per minute. At such speeds, finely comminuted coconut meat particles are produced and maximum release of entrapped fluids are released therefrom, all without increasing the temperature of the resulting slurry to a level conducive to the formation of free fatty acids or other denatured emulsions.

The aqueous solution employed in the slurry machine preferably is obtained from previously treated fresh coconut meat and preferably comprises the aqueous phases of the coconut meat from which the oil and solid byproducts have been separated. It is also preferred that the aqueous solution is heated to a moderate level, not substantially above 100° F., prior to introduction into the slurry maker. A temperature of approximately 120° F. has been found suitable in this connection. The heated aqueous solution greatly enhances flowability of the resulting slurry and preliminarily raises its temperature to facilitate subsequent oil extraction therefrom.

Figure 1:
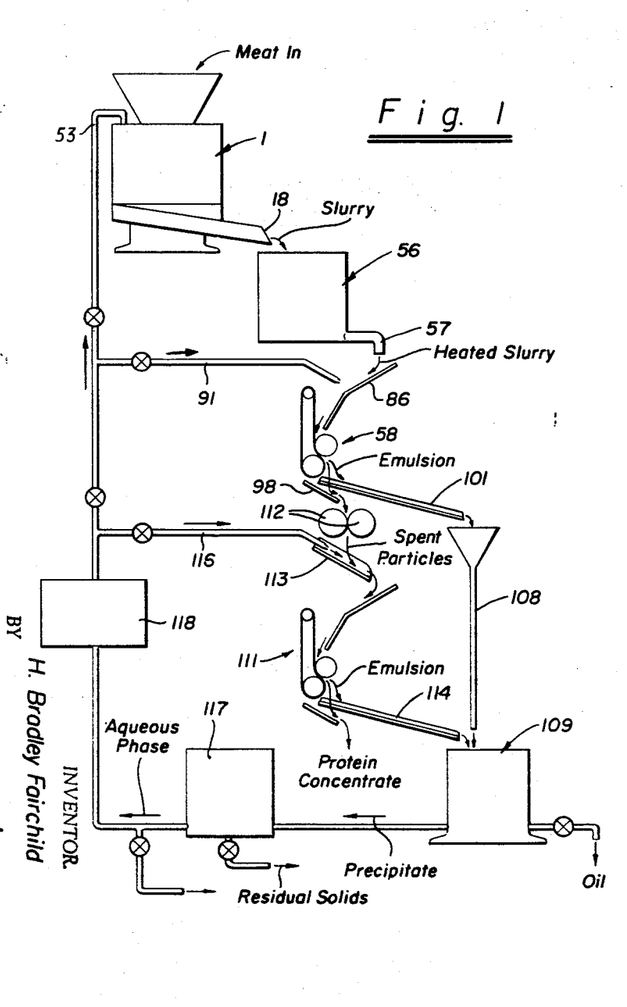
FIG. 1 is a schematic flow sheet diagram illustrating a preferred embodiment of the coconut treating process of this invention.

The next step in the process, as schematically illustrated in FIG. 1, is transfer of the slurry directly into a heat exchanger, generally designated 56, which is of any conventional construction and which is mounted closely adjacent to the slurry making machine for directly receiving its products therefrom. The temperature of the slurry is substantially raised in the heat exhanger to a level in the range of approximately 180°—200° F., but not in excess of 212° F. A temperature of approximately 190° F. is preferred. The slurry is held at that temperature for a comparatively short period which is sufficiently long to complete thorough slurry heating. Heating of the slurry in the heat exchanger for a period of from about 5 to about 10 minutes is generally adequate. The preferred temperature of approximately 190° F. in the heat exchanger has been found effective and at that temperature retention of the slurry in the heat exchanger for longer than 10 minutes is not required. Nor does burning or discoloring of the slurry result.

In the heat exchanger the slurry is thoroughly conditioned to facilitate subsequent release and separation of the natural emulsion containing the desired coconut oil from the remaining constituents of the coconut meat. The heated slurry is discharged from the bottom of the heat exchanger 56 through a suitable conduit 57 and the heated slurry may thereafter be treated in alternate procedures as will be described.

Figure 2:
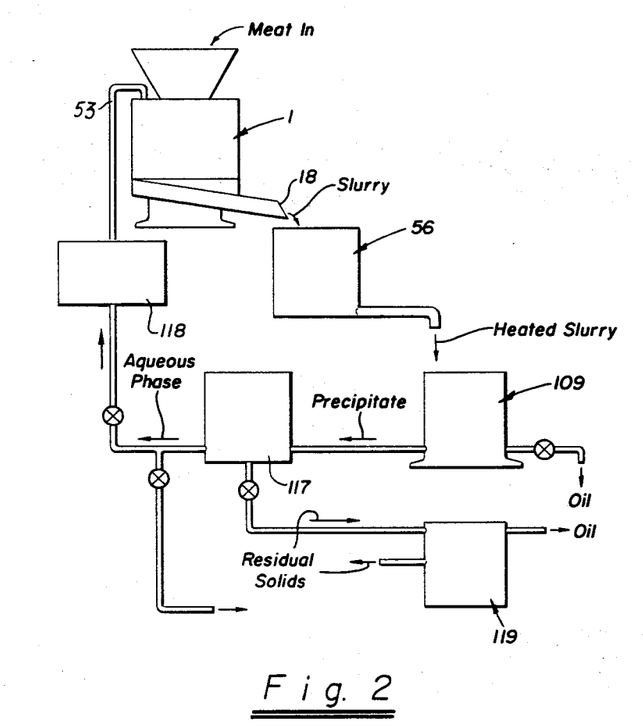
FIG. 2 is a schematic flow sheet diagram of a modified and somewhat simplified coconut treating process.

In the preferred embodiment illustrated in FIG. 1, the heated slurry is transferred directly to at least one improved filter press preferably employed with this invention. Such filter press, generally designated 58, is shown in detail in FIGS. 10 and 11. In the alternate procedure, the filter press is not utilized, as seen in FIG. 2.

The filter press is specifically designed to apply extraction pressure to the heated and conditioned slurry in a manner different from the pressures applied by pressing devices heretofore utilized in conjunction with coconut treatment. Such pressure is described herein as a squeezing or pinching pressure which is applied between a roller of the press and a filter belt in the manner to be described. The term pinch pressing refers to the action of the filter belt in gently yet firmly squeezing the slurry to separate the solid constituents from the liquid natural emulsion of the slurry.

Figures 10, 11:
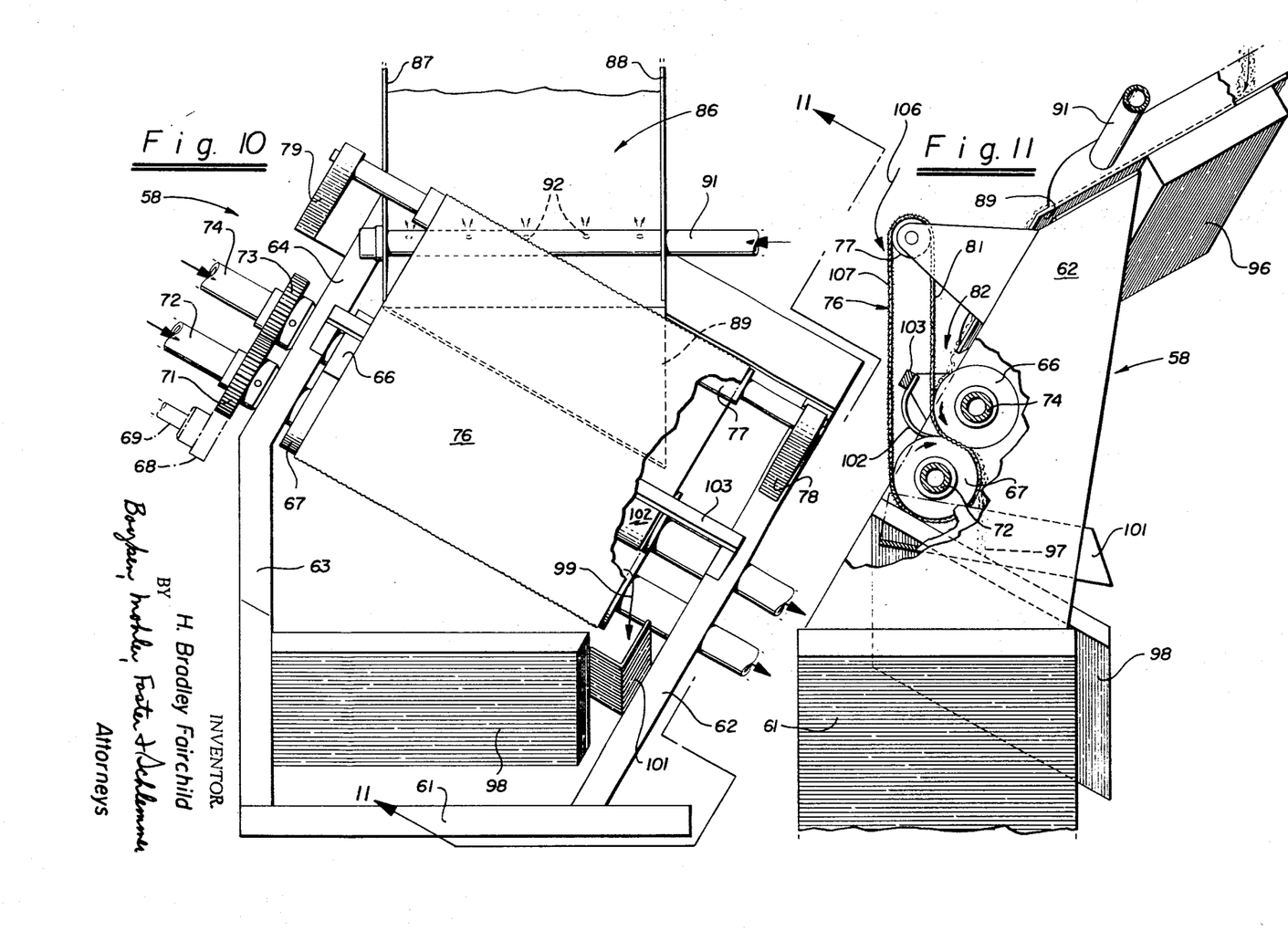
FIG. 10 is a front elevational view, partially cut away, of an improved filter press utilized with the apparatus and process of this invention.
FIG. 11 is a side elevational view, partially cut away, of the filter press taken generally in the plane of line 11-11 of FIG. 10.

Referring to FIGS. 10 and 11, the filter press comprises a base 61 which is horizontally oriented and suitably mounted closely adjacent the aforementioned heat exchanger 56 to receive heated slurry directly therefrom. The base has projecting upwardly therefrom at a predetermined acute angle relative thereto a first frame member 62. A second frame member 63 has a lower portion which projects generally normal to base 61 and an upper portion 64 which is inclined relative to the horizontal. Inclined upper portion 64 extends parallel to the first-mentioned frame member 62.

Extending between the frame member 62 and the inclined portion 64 of frame member 63 are a pair of pressure rolls 66 and 67 respectively which have their axes extending normal to the planes of frame member 62 and the inclined portion 64 of frame member 63. Thus, the axes of rolls 66 and 67 are inclined at a predetermined angle relative to the horizontal reference plane defined by the plane of base 61 of the press. The exact angle of inclination relative to the horizontal is not critical but an inclination of approximately 20° to 40° is suitable, with an angle of approximately 30° being highly effective.

Pressure rolls 66 and 67 may be rotatably mounted in the frame members in any suitable bearing structures, details of which have not been shown. The respective rolls are rotated towards each other as seen in FIG. 11 and are driven in such rotary fashion by any suitable power source, such as a drive gear 68 rotated by a drive shaft 69 connected with an electric motor, not shown. Drive gear 68 in turn is meshed with a gear 71 keyed to the mounting shaft 72 of the lower pressure roll 67. Gear 71 in turn is meshed with another gear 73 keyed to the mounting shaft 74 of upper pressure roll 66. The roll mounting shafts are surrounded by cylinders of hard rubber in known fashion to impart resilient pressing surfaces thereto.

The shafts 72 and 74 preferably are hollow throughout so that a heating fluid may be passed therethrough to elevate the temperatures of the pressure rolls. In this regard, a fluid moderately heated to temperatures below 100° F. is preferred, with fluids having a temperature of approximately 90° F. being suitable. Such heating fluid may be hot water obtained from any suitable source but preferably constitutes aqueous phase solution of the type mentioned previously which is introduced into the slurry making machine. By utilizing such solution, a self-contained operation is provided. The heating fluid is introduced at the upper end of the respective mounting shafts 72 and 74 and pass therethrough to be discharged from the lower inclined end thereof. The discharged fluid may be reintroduced into the overall system, or discarded.

As seen in FIG. 11, the upper pressure roll 66 is slightly offset in the horizontal direction from the lower pressure roll 67 and a porous filter belt 76 passes between the two pressure rolls which, but for the belt, would be in direct pressure contact with each other. Belt 76 is continuous and passes over an idler roll 77 rotatably mounted above and in vertically spaced relationship to the pressure rolls by a pair of mounting brackets 78 and 79 which project from the respective side frame members of the press.

The filter belt employed may take various forms so long as the same is sufficiently porous to permit the transfer of flowable natural emulsion therethrough and to preclude the transfer of fibrous or other coconut solids therethrough. In this regard, the belt may be of perforated plastic, such as nylon, having uniform very fine openings therethrough or it may be of sturdy cloth or webbing which is inherently porous. If a nylon or like plastic belt is used, perforations therein of the nature of approximately one-half millimeter are suitable to produce the desired separation.

It should be understood that the upper is roll 66 is rotated counterclockwise while the lower pressure roll 67 is rotated clockwise so that the filter belt is drawn therebetween. In this connection, as seen in FIG. 11, the idler roll 77 is oriented so that the inner reach 81 of the belt is positioned to extend generally vertically and tangentially with the surface of upper roll 66 to define a converging bight area between the outer surface of the belt and the periphery of the upper roll. It is into this bight area, designated 82, that the heated slurry is introduced by feed structure which in the illustrated embodiment comprises a trough 86 having opposite sidewalls 87 87 and 88 extending therealong to preclude slurry loss. Trough 86, as seen schematically in FIG. 1, receives slurry directly from the heat exchanger 56, or from the slurry making machine 1 if the heat exchanger is not utilized, and carries the same into discharging position in close proximity to the periphery of the upper pressure roll 66 as seen in FIG. 11. In this regard, the trough is longitudinally downwardly inclined toward the pressure roll 66 so that the slurry may flow therealong under the influence of gravity. However, the trough in the transverse direction is free of inclination so that slurry will flow evenly therealong.

The trough also includes mechanism for compensating for the downward inclination of the axes of the pressure rolls so that slurry may be introduced onto the upper periphery of the upper pressure roll generally uniformly along its length. Such mechanism comprises, as seen in dotted lines in FIG. 10, a generally triangular planar extension 89 of the trough which defines a surface along which the slurry may pass into close contact with the upper pressure roll 66 to drop into the bight area 82 between it and the filter belt as seen in FIG. 11.

Preferably, to maintain the temperature of the slurry elevated and to further enhance its flowability, further heated aqueous solution is introduced into the trough prior to the slurry's passage onto pressure roll 66 by means of a supply conduit 91 having spaced openings 92 therein through which the heated aqueous solution is dispensed. The conduit 91 extends through the sidewalls of the trough above the base thereof for the purpose indicated as seen in FIG. 10.

The slurry thus introduced into contact with the filter belt and the upper pressure roll is pinched therebetween in a gentle yet firm pressing operation to separate solid constituents of the slurry from the natural emulsion which contains the liquid constituents thereof, including the oil. To further insure proper feeding of the slurry into the bight area 82, means are provided in conjunction with the trough 86 to insure movement of the slurry thereover. To this end, an electrical vibrator unit 96 is mounted beneath the trough 86 to agitate the same and thereby assist in gravity flow of the slurry. The vibrator may be driven from any suitable power source, such as the source employed to rotate the pressure rolls 66 and 67.

Utilization of the pinching pressure procedure carried out by the subject filter press produces two separate and important advantages.

Firstly, the pressure applies adequate squeezing pressure to the slurry to effect the desired separation but does not apply forces which are so great or are of a character which would effect denaturing of the slurry. As the slurry containing the solid comminuted meat particles therein is carried into the bight area 82 between the filter belt and the pressure roll, the liquid constituents of the slurry in the form of a pasty natural emulsion buildup in the bight and are pushed gently backwards in a direction opposite from the direction of rotation of pressure roll 66 so that the slurry and the particles contained therein are not submitted to the shearing forces which are believed to be responsible for the denaturing of the coconut emulsions with prior pressure screw and like operations. The emulsion is ultimately squeezed through the belt, however, by the squeezing pressure applied thereto.

Second, the fibrous and other solid constituents of the slurry are precluded from reabsorbing any of the separated emulsion which is forced gently out of the slurry by the pressing operation. That is, the fibrous and other solids from which the emulsion has been separated by the backup action described are segregated along the line of maximum pressure between the two pressure rollers and the filter belt so that the emulsion passes through the belt from one side thereof to the other while the fibrous and other solids of the slurry are precluded from passing by the closely woven or finely apertured structure of the belt itself.

Thus, the filter belt serves two primary purposes, namely holding the fibrous solids in place as they enter the bight between the two rollers and the belt and carrying them between the rollers on the belt, and maintaining the separated emulsion out of contact with the separated solids.

In this latter regard, as seen in FIG. 11, the spent fibrous and other solids 97 from which the emulsion has been separated drop under the effects of gravity into a collection hopper 98 from which they may be removed as required for subsequent treatment as required to prepare them for use as a high protein byproduct as mentioned previously. If required a belt scraper (not shown) may be employed in conjunction with hopper 98 to clean the belt of any entrapped solids. The natural emulsion which contains essentially all the sought after oil and other aqueous phase byproducts of the coconut slurry passes through the filter belt onto the top surface of the lower pressure roll 67. Because the pressure rolls are inclined downwardly, the emulsion flows longitudinally of the bottom pressure roll 67 along the upper surface thereof and drops from one end thereof generally in the path shown by the arrow designated 99 into a collection trough 101, from which it ultimately flows for subsequent processing as will be described.

The filter press includes structure in conjunction with the lower pressure roll 67 for stripping the emulsion from the roll and for insuring movement thereof downwardly along the roll into the collection trough 101. Such structure comprises a rubber or other flexible doctor blade 102 secured longitudinally along a mounting bracket 103 which extends laterally between the frame member 62 and the inclined upper portion 64 of frame member 63 of the filter pressure. Doctor blade 102 forms a guide channel which precludes the emulsion from traveling around with the rotation of the lower pressure roll. Because the extracted emulsion is fluid in nature, particularly when aqueous solution is added thereto in feed trough 86, it readily flows longitudinally of the pressure roll and drops into the collection trough 101 as noted.

If required, a vacuum head, not shown but designated by arrow 106 in FIG. 11, may be employed in conjunction with the filter belt in engagement with reach 107 thereof to remove any fibrous or other solids which may not have become dislodged earlier.

Referring again to the schematic showing of FIG. 1, the emulsion extracted in filter press 58 passes from the trough 101 into a conduit 108 for introduction thereby into means provided for separating the oil of the emulsion from the remaining liquid constituents thereof. Such means preferably takes the form of a standard centrifuge unit of known construction, generally designated 109. In this regard, various types of centrifuge units may be employed but one such acceptable unit comprises the "SHARPLES DHL NOZLJECTOR" unit, which is manufactured and marketed by the Sharples Equipment Division of Pennsalt Chemical Corp. of Philadelphia, Pennsylvania. Such a unit is described in their centrifuge Bulletin No. 1285. A centrifuge unit of the particular type noted is preferred because of its small size and relatively light weight, which makes it particularly well adapted for use in an operation to be carried out in the field as herein described. Still referring to FIG. 1, the solid spent slurry particles from which the emulsion has been separated in filter press 58 preferably, but not necessarily, may be passed through a second pressing operation in a second filter press 111 of the same type as that just described. Prior to such introduction, however, it may be preferred to pass the spent particles between a pair of metal crusher rolls 112 which break down the particles and free any entrapped liquids therefrom. From the crusher rolls, the particles pass onto a feed chute 113 which introduces the particles into the second filter press 111. Preferably a quantity of aqueous solution is introduced through a conduit 116 into contact with the spent particles on chute 113 to wet down the particles to facilitate their travel into the second filter press.

The thus doubly pressed particles from which essentially all emulsion has been separated are discharged from the second filter press and collected as protein concentrate which is utilizable in the manner noted previously. The emulsion extracted from the second pressing of the spent particles is deposited by the filter press onto a collection trough of the press which introduces such emulsion into the centrifuge unit 109 for treatment therein, with the emulsion separated by the first filter press 58.

In the centrifuge unit, the coconut oil, because of the natural condition of the separated emulsion, is readily separated under the effects of centrifugal force and passes from the centrifuge for collection and marketing without requiring further treatment. In this regard, when the subject invention is employed in the field at the source of coconuts, the extracted oil may be placed in any suitable containers and transported to market by any available means. The transportation costs for the high commercial grade oil obtained are much less than would be required to transport fresh whole coconuts as noted previously.

The centrifuge also discharges therefrom as a precipitate the nonoily generally liquid phase constituents of the emulsion, which may include some solid residues. Preferably, this precipitate is introduced into a centrifuge-type separator unit, designated 117 in FIG. 1, which may take various forms. in this regard, a SHARPLES SUPER-D-CANTER which is well adapted for handling liquid phase constituents having small size particulate solids therein or an equivalent unit, may be employed. Such a Sharples separator unit is manufactured and marketed by the Sharples Equipment Division of Pennsalt Chemicals Corp.

In the separator unit, any tiny particles of residual solids are removed and may be added to the protein concentrate previously separated, or may be discarded as preferred. The separator unit also discharges the aforementioned aqueous solution which is employed in any quantity required in the treatment of other amounts of coconut meat as already described, or is collected for use as a beverage base or animal feed.

If the aqueous phase solution is reintroduced into the system for the purposes noted previously, it preferably is passed through a heat exchanger 118 prior to its introduction into the first or second filter presses, or into the slurry making machine, as described previously. In the heat exchanger 118, the aqueous phase solution, which contains essentially all the liquid constituents of the coconut meat except the oil, is heated to the desirable levels mentioned previously.

In the schematic showing of FIG. 1, suitable valve structures are provided as required in the system to permit selective passage of the various treatment constituents and products into or from the system as required.

It should be understood that the respective machines and other treating units which comprise the overall apparatus are all of relatively small size so that the entire apparatus may easily be positioned on a suitable transportation vehicle, such as a flat bed truck or the like. In this regard, provided in conjunction with the apparatus, although not specifically shown in the drawings, is a suitable power source, such as a gasoline operated or coconut shell producer gas operated electrical generator, designed to meet the overall requirements of and to provide the necessary electrical supply for the apparatus.

Also, suitable collection facilities for the oil and other byproducts obtained from the treated coconut meat may be provided in conjunction with the apparatus. Preferably as many of the various components of the apparatus as possible are directly connected through closed conduits, which are selectively separable from each other to permit cleaning as necessary. Such enclosing protects the slurry and the emulsion obtained therefrom from any adverse effects of the ambient atmosphere.

In the modified embodiment of this invention schematically shown in FIG. 2, the slurry is transferred directly from the heat exchanger 56 into the centrifuge unit 109 without intermediate filter pressing. This results in a somewhat simplified operation but requires further treatment of the resulting products. In the centrifuge unit, a large proportion of the natural oil is separated but some substantial portion thereof will be discharged with the solid and liquid precipitate. This precipitate is introduced into a separator unit 117 of the type described previously. In the separator unit the aqueous phase of the precipitate is separated and reintroduced into the system or passed to storage as preferred in the manner previously described. If reintroduced into the system, the aqueous phase is first passed through a heat exchanger 118 for the purpose described previously. The residual solids from separator unit 117 are passed into a standard solvent extraction unit, designated 119, from which additional oil is extracted and from which further residual solids, in the form of a protein concentrate, are also extracted.

The modified embodiment of FIG. 2 has the advantage of being a somewhat faster and less expensive operation but has the attended disadvantage of failing to extract natural emulsion and oil in the quantity and of a quality fully comparable to that produced with the preferred embodiment of FIG. 1.

Solvent extraction of centrifuged coconut slurry has heretofore been generally ineffective because of the disadvantages noted of transporting fresh coconuts to a location where such solvent extraction could be accomplished. With the apparatus of this invention, however, because of its small size and readily transportable nature, such solvent extraction can be effectively utilized in the field in known processes after the slurry has been centrifuged to separate the major portion of the oil therefrom as already noted. The solvent extraction unit may be of any well-known construction and may be incorporated into the overall apparatus as is any other component thereof.

Figures 4, 5, 6, 7:
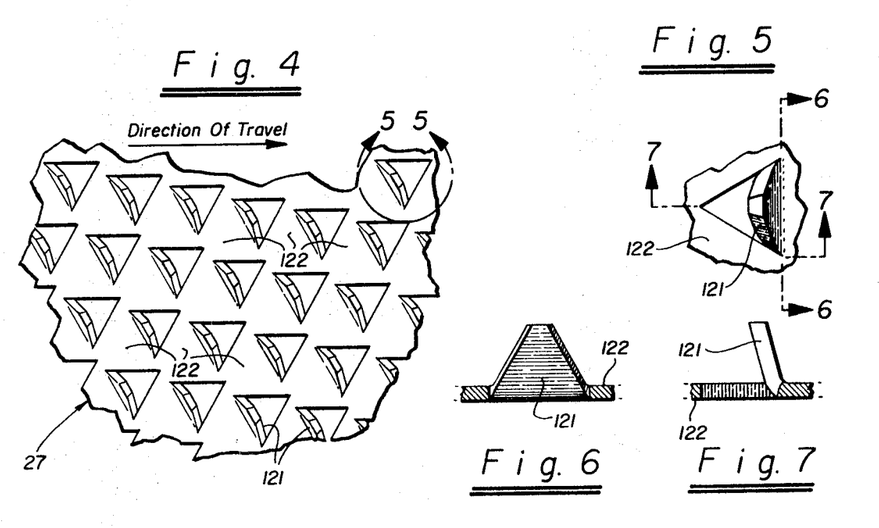
FIG. 4 is a plan view of a portion of the coconut meat shredding cylinder employed in the slurry making machine of FIG. 3.
FIG. 5 is a plan view, on an enlarged scale, of one comminuting tooth of the shredding cylinder, taken along line 5-5 of FIG. 4.
FIGS. 6 and 7 are sectional views of a comminuting tooth taken in the planes of lines 6-6 and 7-7 respectively of FIG. 5.

As noted previously, and referring again to FIG. 3, the rotatable shredding cylinder of the improved slurry making machine may take several forms, one of which is shown in detail in FIGS. 4 through 7. In this embodiment, the shredding cylinder 27 comprises a tube of saw steel, or like quality steel, from which have been punched inwardly toward guide cone 21 a series of closely spaced generally triangular teeth 121, the free corners of which preferably are ground off uniformly as seen in FIGS. 5 through 7. The apertures left by the punched out teeth which remain connected on their baseline with the cylinder, provide passageways for the comminuted particles and freed liquids to pass into contact with the cushioning blanket 46 interposed between the cylinder 27 and the wall of the casing 2. The comminuting teeth as seen in FIG. 4 are closely spaced and adjacent teeth are separated by imperforate areas of the cylinder designated 122. Such imperforate areas tend to guide the shredded particles and fluids toward the apertures formed by teeth 121 as the cylinder rotates in the direction of travel indicated in FIG. 4.

Figure 8:
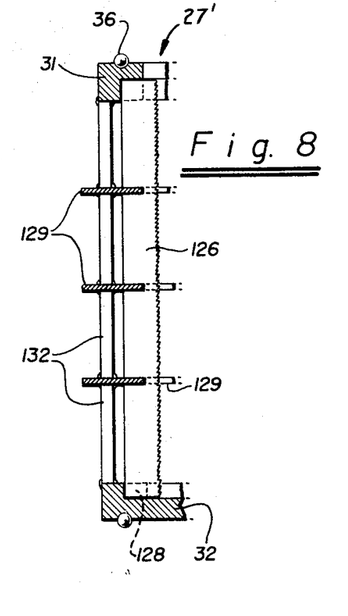
FIG. 8 is a vertical sectional view showing a portion of a modified shredding cylinder construction.
Figure 9:
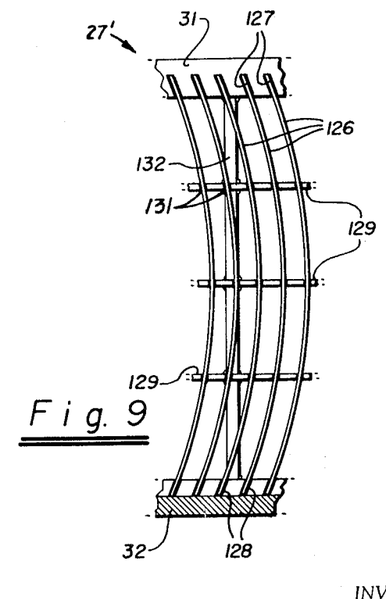
FIG. 9 is an elevational view of the modified cylinder construction of FIG. 8 taken in a plane extending normal to the plane of FIG. 8.

As an important alternative to the shredding cylinder construction just described, reference is directed to FIGS. 8 and 9, also taken in conjunction with FIG. 3. In this embodiment the modified shredding cylinder 27' is defined by a series of thin serrated saw blades 126 which are positioned in slots 127 and 128 provided therefor in the upper mounting ring 31 and lower mounting plate 32 in which the cylinder as a whole is secured. As noted in FIG. 8, each of the saw blades extends the full distance between the upper ring 31 and lower plate 32 and each is longitudinally bowed in the direction of movement of the cylinder as seen in FIG. 9.

To maintain the blades 126 properly positioned and to resist the effects of centrifugal force thereon, a series of vertically spaced retaining rings, designated 129, extend annularly around the cylinder in parallel relationship to the planes of ring 31 and plate 32. Each of the blades are received in slots 131 provided in the retaining rings. Rings 129 in turn are securely maintained in horizontal relationship by means of a series of narrow supporting columns 132 to which the rings 129 are welded or otherwise suitably secured. The supporting columns in turn are welded or otherwise suitably secured at their upper and lower ends to the bottom of ring 31 and the top of plate 32.

It should be understood that the blades 126 are very closely spaced with respect to each other to produce the fine comminution of the coconut meat sections brought into contact therewith when cylinder 27' is rotated.

The apparatus and process of this invention therefore are highly effective in recovering in the manner noted essentially all the valuable coconut oil and other residual byproducts of fresh coconut meat. It should further be noted that the invention is carried forward in a substantially continuous operation which may be initiated and completed in a given work period, such as in an 8-hour workday, without adversely affecting its effectiveness.

While the invention has been described herein with particular reference to the recovery of natural coconut products, it should be understood that the invention may also be utilized in the recovery of oil and other byproducts from other oil bearing materials in which the extraction procedures heretofore available have been less than fully effective. Therefore, the appended claims should be interpreted in light of the broader utilizational aspects of this invention and its application to the treatment of other products.

Having thus made a full disclosure of a preferred embodiment of this invention, reference is directed to the appended claims for the scope to be afforded thereto.

I claim:

1. Apparatus for separating natural oil from the other constituents of coconut meat comprising
    A. means for transforming sections of said meat directly into a flowable slurry,
    B. means for raising the temperature of said slurry, and
    C. centrifuge means into which the heated slurry is introducible and in which the oil from said slurry is separable from the remaining constituents thereof.
2. The apparatus of claim 1 which further includes
    D. means for pinch pressing said slurry prior to introduction thereof into said centrifuge means,
        1. said pressing means effecting separation of the liquid constituents of said slurry as an emulsion which includes said natural oil from the solid fibrous constituents thereof.
3. The apparatus of claim 1 in which said means for transforming said meat sections into a slurry comprises
    1. a housing,
    2. a meat shredding cylinder within said housing,
    3. structure for bringing meat sections introduced into said housing into contact with said cylinder, and
    4. mechanism for moving said cylinder and said structure relative to each other to effect comminution of said meat sections by said cylinder during such contact.
4. The apparatus of claim 1 in which said means for transforming said meat sections into a slurry comprises
    1. a housing,
    2. a guide cone within said housing,
    3. a meat shredding cylinder within said housing generally surrounding said guide cone,
    4. mechanism for rotatably moving said cylinder and said cone relative to each other so that meat sections introduced into said housing are forced against said cylinder and finely comminuted thereby during passage therethrough, and
    5. structure for collecting the slurry of comminuted meat particles and fluids released therefrom during such shredding.
5. The apparatus of claim 4 which further includes
    6. structure for directing an aqueous solution against said cylinder to enhance flowability of the slurry produced thereby.
6. The apparatus of claim 4 in which
    6. said cylinder is rotatably mounted in said housing and said guide cone is fixedly mounted therein, and in which
    7. said mechanism rotates said cylinder generally concentrically with said cone about the axis thereof.
7. The apparatus of claim 4 which further includes
    6. cushioning structure interposed between said housing and said cylinder for cushioning the impact of the comminuted particles and released fluids against said housing following passage thereof through said cylinder.

8. The apparatus of claim 5 in which said structure for directing an aqueous solution against said cylinder comprises
   a. a conduit surrounding said cylinder adjacent the top thereof,
   b. said conduit being interposed between said housing and said cylinder and having a series of dispensing openings therein oriented to direct said solution toward said cylinder into contact with the comminuted particles and released fluids passing therethrough.

9. The apparatus of claim 4 in which said meat shredding cylinder comprises
   a. an elongated metal ring having a series of closely spaced shredding teeth punched therefrom and projecting toward said guide cone, and
   b. a series of openings between said teeth for permitting passage of comminuted particles and released fluids through said ring.

10. The apparatus of claim 4 in which said cylinder comprises
    a. a series of closely spaced generally vertically extending shredding blades positioned around and defining the body of said cylinder, and
    b. structure for securely supporting said blades in predetermined orientation during relative rotation between said cylinder and guide cone.

11. The apparatus of claim 2 in which said means for pinch pressing said slurry comprises a filter press which includes
    1. a rotatable pressure roll,
    2. a porous filter belt passing generally tangentially over said pressure roll during rotation thereof, and
    3. structure for introducing said slurry into the bight area between said belt and said pressure roll,
    4. said belt and roll pinching the liquid constituents from said slurry as an emulsion which passes through said belt while the solid fibrous constituents thereof pass between said belt and said pressure roll without passing through said belt.

12. The apparatus of claim 2 in which said means for pinch pressing said slurry comprises a filter press which includes
    1. a pair of generally parallel rotatable pressure rolls.
    2. an idler roll rotatably mounted in spaced relationship to said pressure rolls,
    3. a continuous porous filter belt passing around said idler roll and between said pressure rolls and around one of the latter, said belt passing generally tangentially over the other of said pressure rolls,
    4. mechanism for rotating said pressure rolls to draw said belt therebetween,
    5. structure for introducing said slurry into the bight area between one side of said belt and said other pressure roll whereby said slurry is pinched between said belt and said other roll during rotation of said rolls,
    6. said belt permitting the liquid constituents of said slurry to pass therethrough as an emulsion and to be collected on the opposite side thereof while the solid fibrous constituents of said slurry pass with said belt between said pressure rolls without passing through said belt for subsequent collection thereof.

13. The apparatus of claim 12 which further includes
    7. structure in conjunction with said one pressure roll for stripping the emulsion which passes through said belt from said one roll during collection of said emulsion.

14. The apparatus of claim 12 in which
    7. said pressure rolls are rotatably mounted with their axes extending at a predetermined angular inclination relative to a horizontal reference plane so that said emulsion which passes through said belt may flow downwardly along said one roll to a collection point adjacent one end thereof, said filter press further including
    8. structure for collecting said emulsion at said end of said one roll, and
    9. a doctor blade in contact with said one roll for guiding said emulsion along the length of such roll toward said collecting structure.

15. The apparatus of claim 12 which further includes
    7. structure for heating said pressure rolls to enhance the flowability of said emulsion.

16. The apparatus of claim 14 in which said structure for introducing said slurry into the bight area between said belt and said one roll includes
    a. mechanism for compensating for the inclination of said pressure rolls so that said slurry is introduced into said bight area generally uniformly along the length of said other roll.

17. A process for treating fresh coconut meat to separate the natural oil from the other constituents thereof comprising
    A. transforming sections of said meat directly into a flowable slurry by finely comminuting said meat sections,
    B. raising the temperature of said slurry, and
    C. centrifuging said slurry to separate the natural oil thereof from the solid fibrous constituents and other aqueous phase constituents thereof.

18. The process of claim 17 which further includes the step of
    D. pinch pressing said heated slurry prior to centrifuging the same to separate the liquid constituents, including said oil, of said slurry as a natural flowable emulsion from the solid fibrous constituents of said slurry.

19. The process of claim 17 which further includes the step of
    D. treating said meat sections, while the same are being comminuted, with a quantity of heated aqueous phase constituents previously obtained from coconut meat, whereby the temperature of the resulting slurry is raised and its flowability is enhanced.

20. The process of claim 17 in which said slurry is heated in a separate operation to approximately 190° F. and maintained at such temperature for at least approximately 5 minutes prior to further processing thereof.

21. The process of claim 18 in which said pinch pressing of said slurry to effect separation of said natural emulsion from said fibrous constituents is effected by introducing said slurry into the bight area between a porous filter belt and one of a pair of pressure rolls between which said belt passes, whereby said emulsion is squeezed through said belt for collection on the other side thereof while said fibrous constituents pass with said belt between said rolls.

22. The process of claim 18 in which said meat sections are comminuted by bringing the same into contact with the inner surface of a rapidly rotating apertured shredding cylinder by which said meat sections are finely divided and forced through said cylinder under the effects of centrifugal force for collection on the outer side thereof.